United States Patent
Kurata et al.

(10) Patent No.: US 7,921,014 B2
(45) Date of Patent: Apr. 5, 2011

(54) SYSTEM AND METHOD FOR SUPPORTING TEXT-TO-SPEECH

(75) Inventors: Gakuto Kurata, Kanagawa-ken (JP); Toru Nagano, Kanagawa-ken (JP); Masafumi Nishimura, Kanagawa-ken (JP); Ryuki Tachibana, Kanagawa-ken (JP)

(73) Assignee: Nuance Communications, Inc., Burlington, MA (US)

( * ) Notice: Subject to any disclaimer, the term of this patent is extended or adjusted under 35 U.S.C. 154(b) by 866 days.

(21) Appl. No.: 11/774,798

(22) Filed: Jul. 9, 2007

(65) Prior Publication Data

US 2008/0046247 A1 Feb. 21, 2008

(30) Foreign Application Priority Data

Aug. 21, 2006 (JP) .............................. 2006-224110

(51) Int. Cl.
*G10L 13/00* (2006.01)
(52) U.S. Cl. ................................ 704/260; 704/E13.001
(58) Field of Classification Search .................. 704/260, 704/E13.001, E13.005
See application file for complete search history.

(56) References Cited

U.S. PATENT DOCUMENTS

| 7,467,087 | B1 * | 12/2008 | Gillick et al. ................. 704/260 |
| 7,630,898 | B1 * | 12/2009 | Davis et al. .................... 704/266 |
| 7,756,708 | B2 * | 7/2010 | Cohen et al. ................... 704/244 |
| 2007/0055526 | A1 * | 3/2007 | Eide et al. ..................... 704/260 |

FOREIGN PATENT DOCUMENTS

| JP | 11-175082 | 7/1999 |
| JP | 2001-350489 | 12/2001 |
| JP | 2003-044073 | 2/2003 |

OTHER PUBLICATIONS

A Stochastic Approach to Phoneme and Accent Estimation, T. Nagano, S. Mori, and M. Nishimura, Interspeech 2005 pp. 3293-3296.
Recent Improvements to The IBM Trainable Speech Synthesis Program, E. Eide, A. Aaron, R. Bakis, P. Cohen, R. Donovan, W. Hamza, T. Mathes, M. Picheny, M. Polkosky, M. Sith, M. Viswanathan.

* cited by examiner

*Primary Examiner* — Angela A Armstrong
(74) *Attorney, Agent, or Firm* — Wolf, Greenfield & Sacks, P.C.

(57) ABSTRACT

A system for generating high-quality synthesized text-to-speech includes a learning data generating unit, a frequency data generating unit, and a setting unit. The learning data generating unit recognizes inputted speech, and then generates first learning data in which wordings of phrases are associated with readings thereof. The frequency data generating unit generates, based on the first learning data, frequency data indicating appearance frequencies of both wordings and readings of phrases. The setting unit sets the thus generated frequency data for a language processing unit in order to approximate outputted speech of text-to-speech to the inputted speech. Furthermore, the language processing unit generates, from a wording of text, a reading corresponding to the wording, on the basis of the appearance frequencies.

1 Claim, 9 Drawing Sheets

| WORDING w | ... | KYOUTO | TAWAA | HOTERU | ... | TAWAA | HOTERU |
|---|---|---|---|---|---|---|---|
| WORD CLASS t | ... | PROPER NOUN | GENERAL NOUN | GENERAL NOUN | ... | GENERAL NOUN | GENERAL NOUN |
| PRONUNCIATION s ACCENT a | ... | kyo : to<br>LHH | ta wa :<br>HHH | ho te ru :<br>HLL | ... | ta wa :<br>HLL | hoteru<br>HLL |

| PARTITION BETWEEN PHRASES | | KYOUTO \| TAWAA | KYOUTO \| TAWAA | KYOU \| TOTAWAA | ... |
|---|---|---|---|---|---|
| WORD CLASS | | PROPER NOUN : GENERAL NOUN | PROPER NOUN : GENERAL NOUN | GENERAL NOUN : GENERAL NOUN | ... |
| READING | PRONUNCIATION | kyo:totawa: | kyo:totawa: | kyototawa: | ... |
| | ACCENT | LHHHHH | LHHHLL | HLLHL | ... |
| APPEARANCE FREQUENCY | | 30 | 60 | 5 | ... |

SYSTEM AND METHOD FOR SUPPORTING TEXT-TO-SPEECH

CROSS-REFERENCE TO RELATED APPLICATIONS

This application claims priority from Japanese Patent Application No. 2006-224110 filed on Aug. 21, 2006.

FIELD OF THE INVENTION

This invention relates generally to the field of text-to-speech, and more particularly to a system for improving accuracy of text-to-speech by causing a language processing unit to learn;

BACKGROUND OF THE INVENTION

In text-to-speech (TTS), in order to output speech which is easily understandable and natural for a listener, it is desirable to accurately determine a way of reading (hereafter, simply called a reading) incorporating not only pronunciations but also accents. In conventional text-to-speech techniques, generation of accents is realized in a manner that numerous rules for determining appropriate accents are found out on a trial-and-error basis by analyzing standard speeches of an announcer or the like. However, generation of the appropriate rules requires various kinds of work performed by experts, and there has been a risk of requiring enormous costs and time.

There has been proposed a technique for determining a pronunciation and an accent of a phrase in inputted text by using statistical information, instead of rules, such as appearance frequencies of pronunciations and accents of the phrase in previously provided learning data. See Nagano, Mori, and Nishimura, "Kakuritsuteki model wo mochiita yomikata oyobi akusento suitei (Reading and Accent Estimation Using Stochastic Model)," SIG-SLP57 (July, 2005). According to this technique, accurate appearance frequencies can be computed on the premise that a sufficient amount of the learning data is available, and the processing for generating accents can be made more efficient since it is not necessary to generate rules.

However, in the abovementioned technique using the statistical information requires a large amount of learning data for which accurate pronunciations and accents are provided. In order to generate such learning data, it is required that experts who are conversant with classification of accents and the like manually provide information on accents to each phrase. On the other hand, in sound processing for generating actual speech from information on reading such as pronunciations and accents, data on waveforms of speech actually vocalized by an announcer or the like are often utilized. See Eide, E., et al., "Recent Improvements to the IBM. Trainable Speech Synthesis System" Proc. ICASSP 2003, Hong Kong, Vol. 1, pp. 708-711 (April, 2003). For this reason, outputted speech sometimes becomes unnatural because inconsistency occurs between the information on accents manually provided, and synthesized speech utilizing the actual speech.

Consequently, an object of the present invention is to provide a system, a method and a program which are capable of solving the abovementioned problem. This object can be achieved by a combination of characteristics described in the independent claims in the scope of claims. Additionally, the subordinate claims therein define further advantageous specific examples.

SUMMARY OF THE INVENTION

Briefly stated, a system for generating high-quality synthesized text-to-speech includes a learning data generating unit, a frequency data generating unit, and a setting unit. The learning data generating unit recognizes inputted speech, and then generates first learning data in which wordings of phrases are associated with readings thereof. The frequency data generating unit generates, based on the first learning data, frequency data indicating appearance frequencies of both wordings and readings of phrases. The setting unit sets the thus generated frequency data for a language processing unit in order to approximate outputted speech of text-to-speech to the inputted speech. Furthermore, the language processing unit generates, from a wording of text, a reading corresponding to the wording, on the basis of the appearance frequencies.

According to an embodiment of the invention, a system for supporting text-to-speech includes a learning data generating unit which recognizes inputted speech, and generates first learning data in which wordings of phrases are associated with readings thereof; a frequency data generating unit which generates, on the basis of the first learning data, frequency data indicating appearance frequencies of both wordings and readings of phrases; a language processing unit; and a setting unit which sets frequency data in the language processing unit for generating, from a wording of text, a reading corresponding to the wording, on the basis of appearance frequencies of readings corresponding to the wording in order to approximate outputted speech of text-to-speech to the inputted speech.

According to an embodiment of the invention, a system for supporting text-to-speech includes a learning data generating unit which recognizes inputted speech, and generates first learning data in which wordings of phrases are associated with readings thereof; a language processing unit; and a learning unit which causes the language processing unit to learn on the basis of the first learning data, the language processing unit generating, from a wording of text, a reading corresponding to the wording, on the basis of appearance frequencies in the first learning data in order to approximate outputted speech of text-to-speech to the inputted speech.

According to an embodiment of the invention, a method of supporting text-to-speech includes the steps of: (a) recognizing inputted speech, and generating first learning data in which wordings of phrases are associated with readings thereof; (b) generating, on the basis of the first learning data, frequency data indicating appearance frequencies of both wordings, and readings of phrases; and (c) setting frequency data in a language processing unit which generates, from a wording of text, a reading corresponding to the wording, on the basis of appearance frequencies of readings corresponding to the wording in order to approximate outputted speech of text-to-speech to the inputted speech.

According to an embodiment of the invention, a program product for allowing an information processing apparatus to function as a system for supporting text-to-speech causes the information system to function as a learning data generating unit which recognizes inputted speech, and generates first learning data in which wordings of phrases are associated with readings thereof; a frequency data generating unit which generates, on the basis of the first learning data, frequency data indicating appearance frequencies of both wordings, and readings of phrases; and a setting unit which, in order to approximate outputted speech of text-to-speech to the inputted speech, sets frequency data in a language processing unit for generating, from a wording of text, a reading corresponding the wording, on the basis of appearance frequencies of readings corresponding to the wording.

According to an embodiment of the invention, an article of manufacture comprises a computer usable medium having computer readable program code means embodied therein for supporting text-to-speech, the computer readable program code means in the article of manufacture including computer readable program code means for causing a computer to effect recognizing inputted speech and generating first learning data in which wordings of phrases are associated with readings thereof; computer readable program code means for causing a computer to effect generating, on the basis of the first learning data, frequency data indicating appearance frequencies of both wordings, and readings of phrases; and computer readable program code means for causing a computer to effect setting frequency data in a language processing unit which generates, from a wording of text, a reading corresponding to the wording, on the basis of appearance frequencies of readings corresponding to the wording in order to approximate outputted speech of text-to-speech to the inputted speech.

BRIEF DESCRIPTION OF THE DRAWINGS

FIG. 3 shows one example of first learning data.

FIG. 4 shows one example of frequency data.

DETAILED DESCRIPTION OF THE PREFERRED EMBODIMENT

Figure 1:
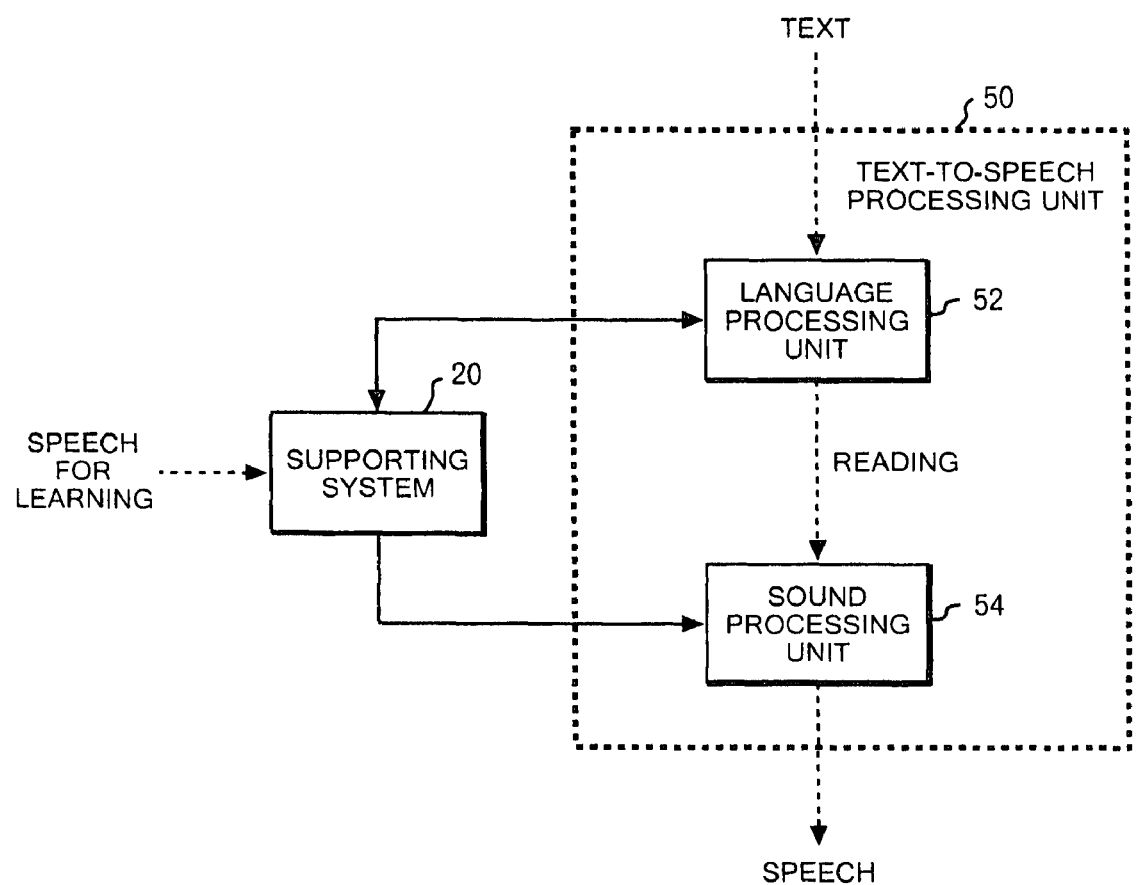
FIG. 1 shows high level configurations of a supporting system and a text-to-speech processing unit.

FIG. 1 shows high level configurations of a supporting system 20 and a text-to-speech processing unit 50. An information system shown in FIG. 1 includes the supporting system 20 and the text-to-speech processing unit 50. Upon acceptance of an input of text, the text-to-speech processing unit 50 generates and outputs speech reading out the text. Specifically, the text-to-speech processing unit 50 includes a language processing unit 52 and a sound processing unit 54. The language processing unit 52 generates a reading corresponding to a wording of inputted text, based on appearance frequencies of readings of the text, and outputs the reading to the sound processing unit 54. A reading means, for example, kinds of pronunciations, pitches of accents, pausing positions of pronunciations, and the like, and does not mean specific waveforms of speech. Then, the sound processing unit 54 generates speech based on this reading which has been inputted thereto, and outputs the speech.

The supporting system 20 according to this embodiment accepts an input of speech for learning, generates information, such as appearance frequencies of pronunciations and accents of phrases, based on this speech, and sets the information in the text-to-speech processing unit 50. Thereby, the supporting system 20 is intended to efficiently generate high-quality synthesized speech by supporting the text-to-speech processing unit 50.

Figure 2:
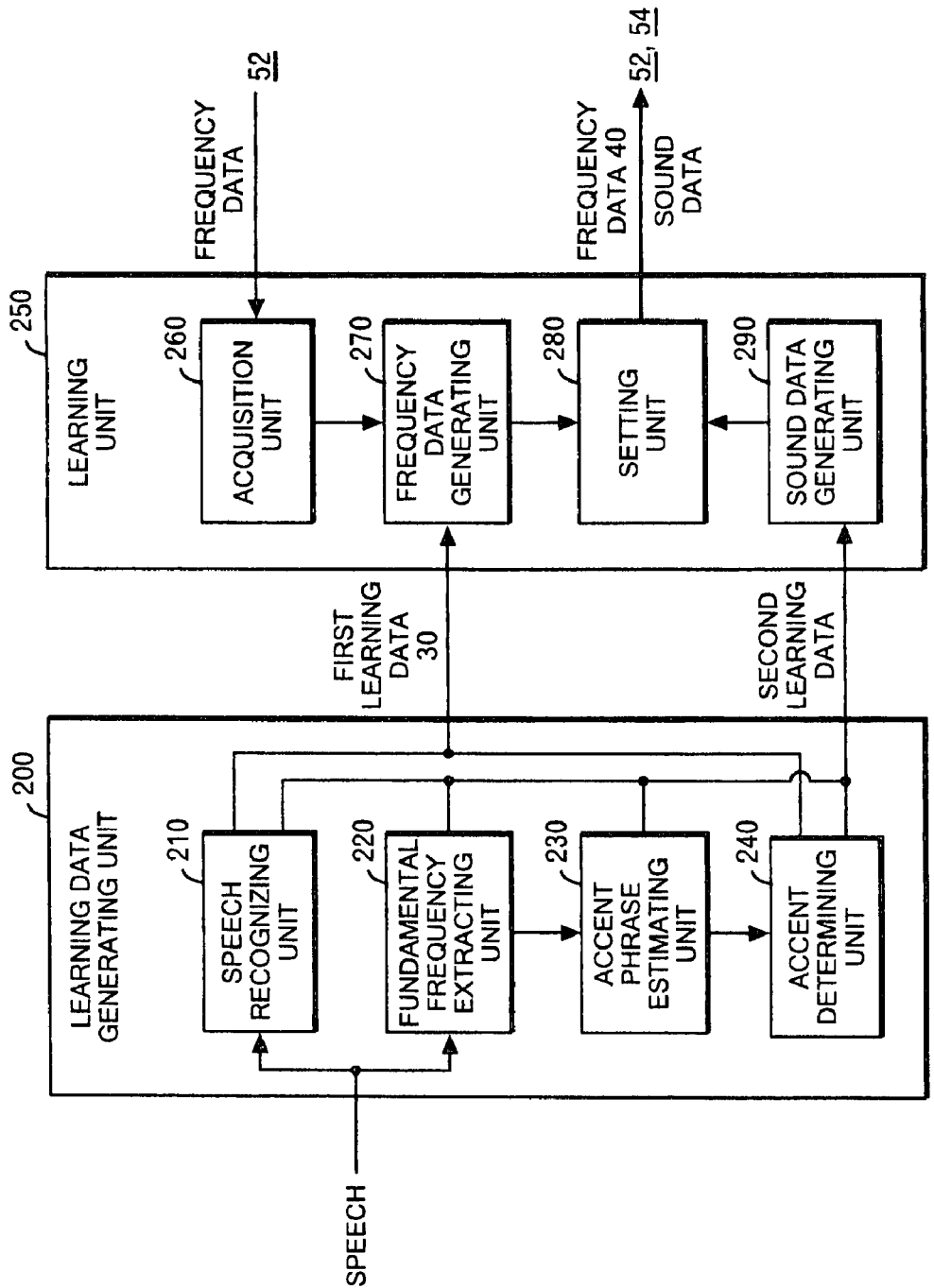
FIG. 2 shows an entire configuration of the supporting system.

FIG. 2 shows an entire configuration of the supporting system 20. The supporting system 20 includes a learning data generating unit 200 and a learning unit 250. The learning data generating unit 200 recognizes inputted speech, and generates first learning data 30 in which wordings of phrases are associated with readings thereof. Additionally, the learning data generating unit 200 may generate second learning data in which readings of phrases are associated with waveform data of phonemes, and the like. These sets of learning data thus generated are outputted to the learning unit 250. In order to approximate outputted speech of text-to-speech to this inputted speech, the learning unit 250 causes the language processing unit 52 to learn based on the first learning data 30, and causes the sound processing unit 54 to learn based on the second learning data.

The learning data generating unit 200 includes a speech recognizing unit 210, a fundamental frequency extracting unit 220, an accent phrase estimating unit 230, and an accent determining unit 240. The speech recognizing unit 210 recognizes the inputted speech, generates the first learning data 30 in which wordings of phrases are associated with readings thereof, and outputs the first learning data 30 to the learning unit 250. The speech recognizing unit 210 may receive, as an input, speech reading out previously determined text for learning, and generate the first learning data 30 by associating, with the text for learning, a reading recognized thereby. Additionally, the speech recognizing unit 210 may collectively recognize wordings and readings of phrases by recognizing speech freely pronounced by a speaker, and generate the first learning data 30. In this case, highly accurate recognition becomes difficult in some cases, and therefore, the speech recognizing unit 210 may display a recognition result to a user, and then accept a correcting operation by the user.

The fundamental frequency extracting unit 220 measures frequencies of the inputted speech, and outputs to the accent phrase estimating unit 230 data in which the frequencies are arranged in chronological order. Based on the data on the frequencies which has been inputted, the accent phrase estimating unit 230 divides the speech into plural accent phrases, and outputs to the accent determining unit 240 a result of the division along with the data on the frequencies. The accent determining unit 240 classifies an accent of the speech in each of the accent phrases into any one of predetermined plural kinds of accents, and outputs a group of kinds of accents with respect to each of the accent phrases. Information on these accents is outputted as the first learning data 30 to the learning unit 250 associated with the result of speech recognition by the speech recognizing unit 210. Accordingly, a reading of phrases contained in the first learning data 30 contains not only pronunciations recognized by the speech recognizing unit 210 but also accents of phrases determined by the accent determining units 240. One example thereof is shown in FIG. 3.

FIG. 3 shows one example of the first learning data 30. In the first learning data 30, phrases recognized in the inputted speech are recorded in the order in which the phrases are pronounced, in a manner that each of the phrases is associated with a wording w of each of the phrases, a word class t thereof, a pronunciation s thereof, and an accent a thereof. For example, phrases "kyouto (Kyoto)," "tawaa (tower)" and "hoteru (hotel)" are sequentially pronounced in the first half part of the inputted speech, and word classes' recognized are proper noun, general noun and general noun, respectively. In addition, pronunciations of these phrases are "kyo:to," "tawa:" and "hoteru," respectively, where the symbol ":" indicates a prolonged sound. Furthermore, accents of these phrases are "LHH," "HHH" and "HLL," respectively. As one example, the accent of "LHH" indicates that the pronunciation "kyo:to" is pronounced in the order of "low (L)," "high (H)" and "high (H)."

Thus, the speech recognizing unit 210 determines separations between phrases contained in speech, and judges a wording, a word class and a pronunciation of each of the phrases through speech recognition processing. These pieces of information can be acquired by applying conventional speech recognition technologies. For example, in the conventional speech recognition technologies for converting speech into text, it is often the case that: separations between phrases in the speech, and word classes of the respective phrases are judged in the form of internal processing in order to enhance accuracy in the recognition; and the text alone is finally outputted with results of such internal judgment being excluded from the output. By using the results of such internal judgment in any one of the conventional speech recognition technologies, the speech recognizing unit 210 can judge a wording, a word class and a pronunciation of a phrase.

Note that, in the first learning data 30 in FIG. 3, though the phrase is likewise written as "kyouto", the phrase is recognized in the latter half part of the inputted speech as a phrase having a different accent. Specifically, the phrase is recognized as having an accent of "HLL" which differs from the accent of "LHH" having been recognized in the first-half period. Likewise, the phrase written as "tawaa" has different accents in the first-half part and in the latter-half part. Thus, there is a case where a Japanese phrase is spoken with pronunciations and accents which are different depending on a relation of the phrase with a context or preceding and following phrases even if the phrase is written in the same wording. For this reason, in text-to-speech, unless a pronunciation is determined in consideration of such differences in context, a speech sounding natural to a user cannot be generated in many cases. The supporting system 20 according to this embodiment can output high-quality synthesized speech in consideration of such differences in context and the like.

Referring back to FIG. 2, accents determined by the accent determining unit 240 are outputted to a sound data generation unit 290 as the second learning data along with information indicating pronunciations recognized by the speech recognizing unit 210, fundamental frequencies extracted by the fundamental frequency extracting unit 220, and separations between accent phrases estimated by the accent phrase estimating unit 230. The learning unit 250 includes an acquisition unit 260, a frequency data generating unit 270, a setting unit 280, and the sound data generating unit 290. The acquisition unit 260 acquires frequency data having been already used by the language processing unit 52. Based on the first learning data 30, the frequency data generating unit 270 generates frequency data indicating a wording of phrases and appearance frequencies of readings thereof. The thus generated frequency data 40 may be generated by synthesizing frequency data acquired by the acquisition unit 260 and frequency data determined on the basis of the first learning data 30.

The setting unit 280 sets the frequency data 40 in the language processing unit 52 in order to approximate the outputted speech to the inputted speech for learning. Concerning the second learning data, the sound data generating unit 290 generates sound data such as waveform data and rhythm models based on data such as readings of phrases, phoneme alignments, positions of accent phrases, positions of pauses, and the like. The sound data determines, for example, a duration, a pitch, an intensity, a position of a pause, a length of the pause, and the like of each phoneme. The setting unit 280 sets this sound data in the sound processing unit 54.

FIG. 4 shows one example of the frequency data 40. In the frequency data 40, appearance frequencies of plural different combinations of readings are associated with each combination of plural phrases continuously written. For example, a wording of "kyouto tawaa" is continuously written, and pronounced in series as "kyo: totawa:" or the like. In addition, though the wording of "kyouto tawaa" is a combination of the phrases "kyouto" and "tawaa," there is also a case where, depending on a performance capability and the like of the speech recognizing unit 210, the wording is recognized as a combination of phrases "kyou" and "totawaa." In the frequency data 40, each combination of phrases which include at least one same wording as a part of the phrase is associated with information indicating separations between phrases, combinations of word classes, and combinations of readings. Furthermore, appearance frequencies of each, of these combinations are associated with each of the combinations of phrases.

Specifically, in the frequency data 40, with a combination of "kyouto tawaa" in, wording, information on separations between phrases is associated, the information indicating that "kyouto" and "tawaa" are different phrases. Furthermore, in the frequency data 40, with this combination in wording, a combination of word classes which is "proper noun: general noun" is associated. Additionally, in the frequency data 40, a combination of pronunciations which is "kyo: totawa:," and a set of kinds of accents respectively corresponding to accent phrases which is "LHHHHH," are associated therewith. Additionally, in the frequency data 40, an index value of 30 indicating an appearance frequency of the combination is associated therewith. According to an actual example such as "kyouto tawaa hoteru," the phrases "kyouto tawaa" is mostly However, a frequency at which this wording is thus recognized is low, and the extremely low index value of 5 is associated with this combination in reading. Therefore, this combination in reading is rarely adopted as a reading generated by the language processing unit 52.

Figure 5:
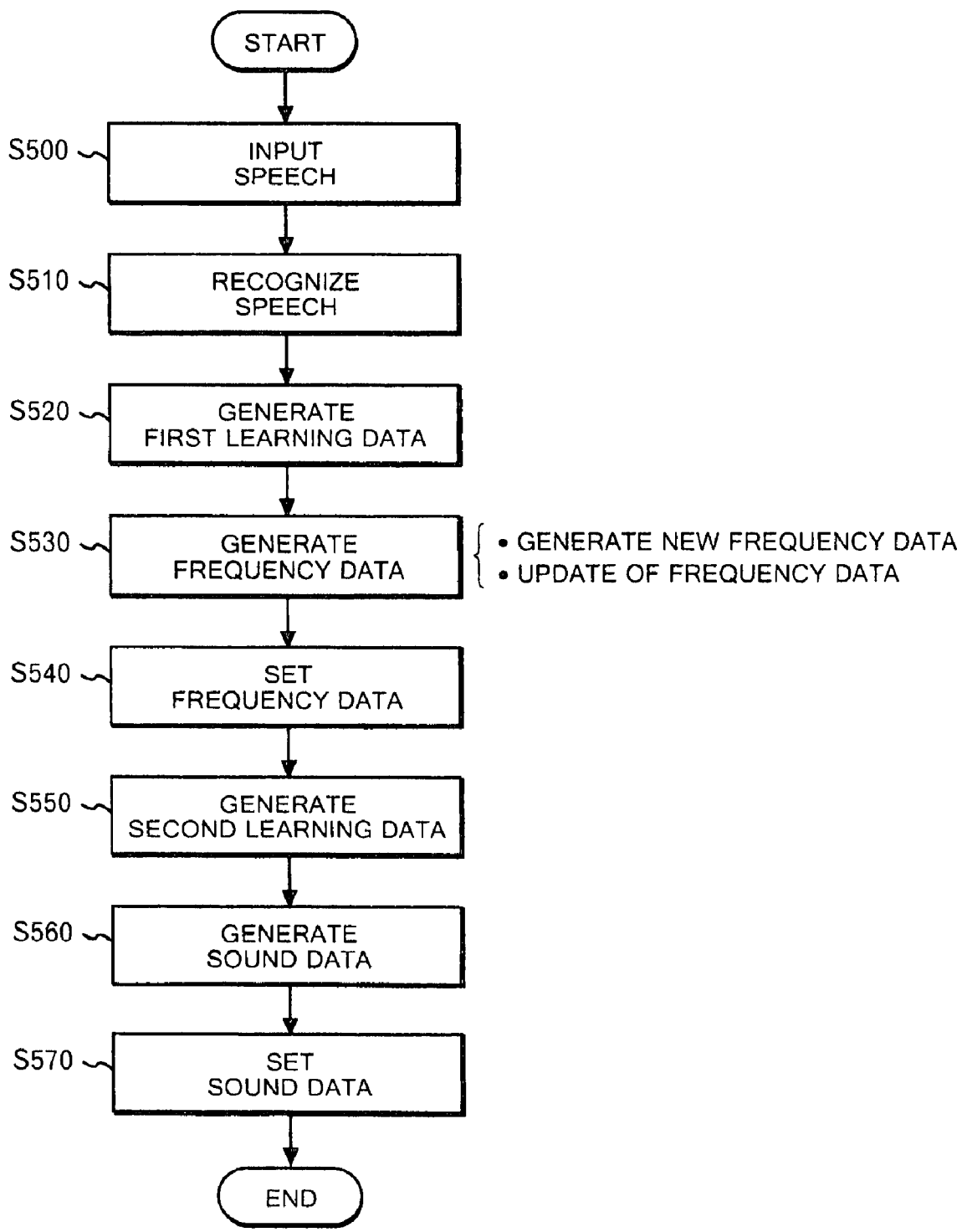
FIG. 5 shows one example of processing in which data of various kinds are set in the text-to-speech processing unit by the supporting system.
Figure 6:
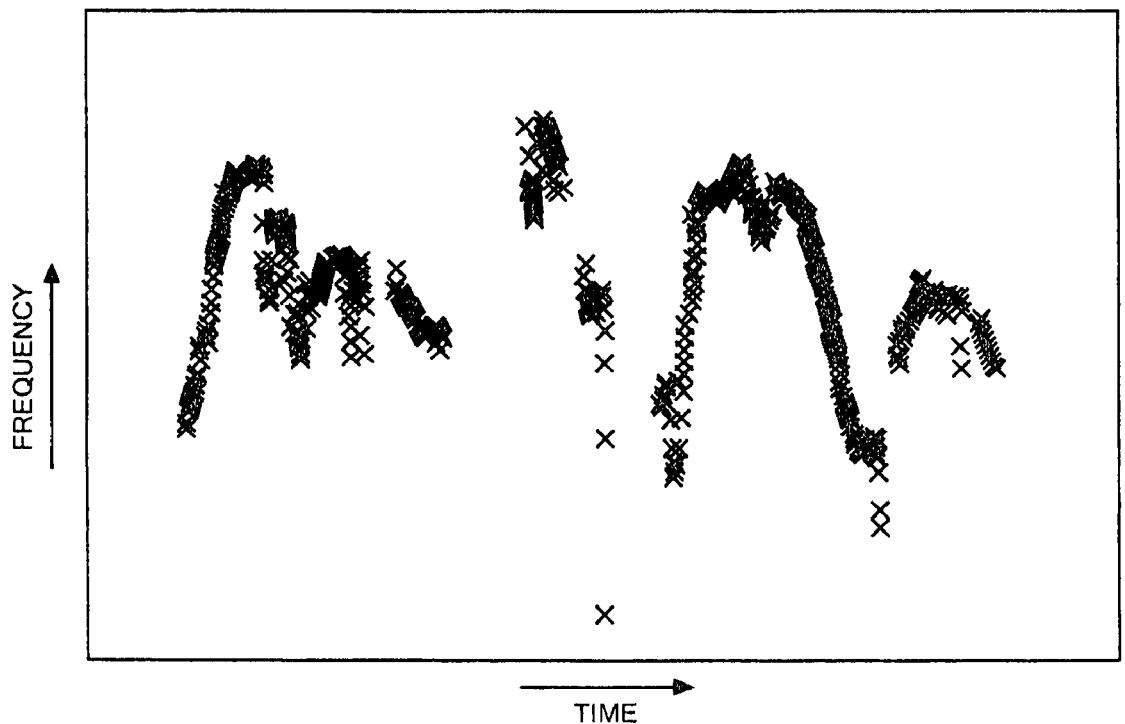
FIG. 6 shows frequencies measured from speech for learning.
Figure 7:
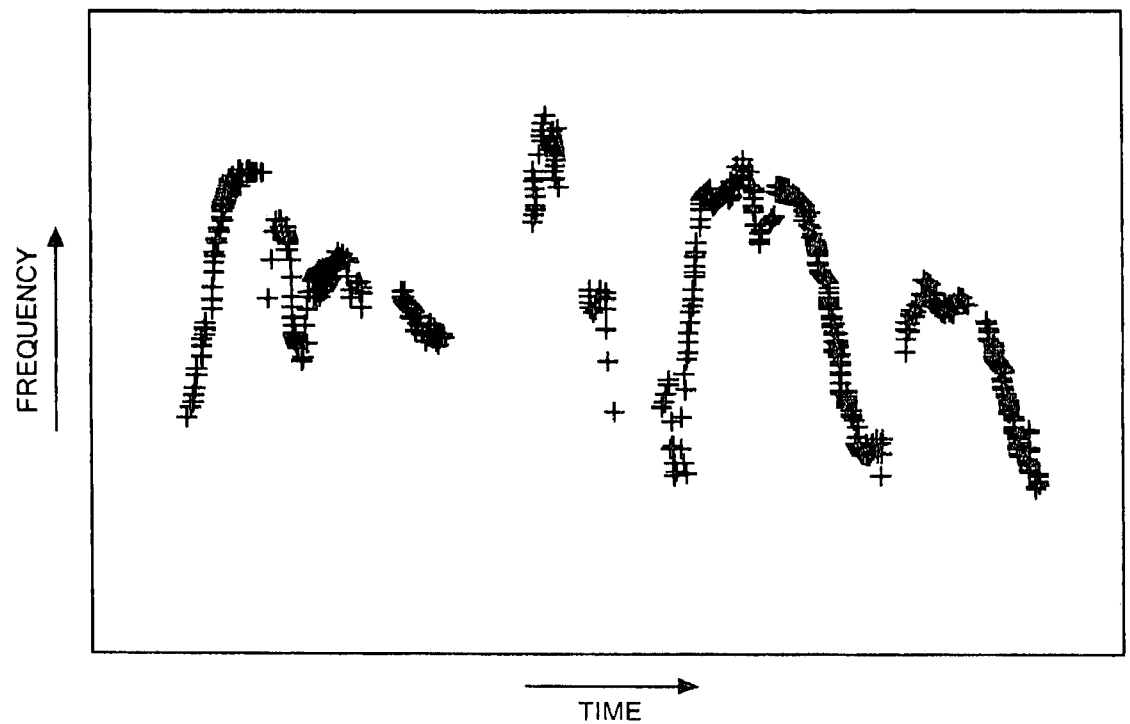
FIG. 7 shows confidence parts among the measured frequencies.
Figure 8:
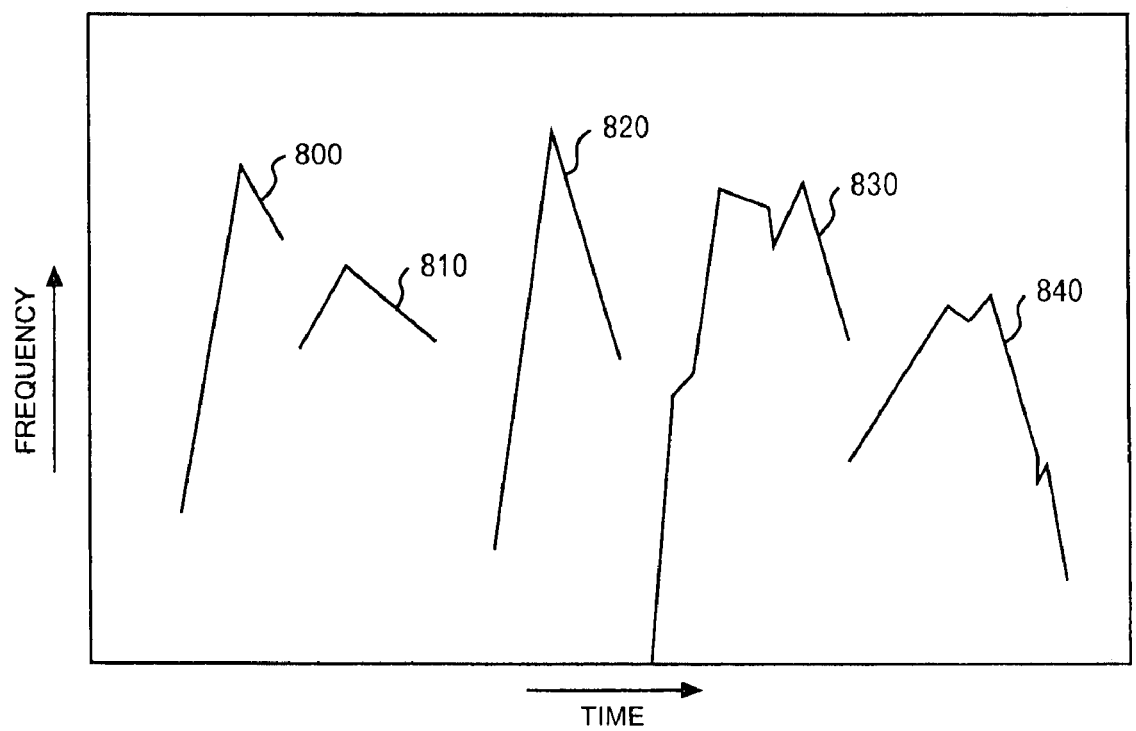
FIG. 8 shows specific examples of estimated accent phrases.

FIG. 5 shows one example of processing in which various kinds of data are set in, the text-to-speech processing unit 50 by the supporting system 20. The speech recognizing unit 210 accepts an input of speech for learning (S500). The speech recognizing unit 210 performs processing of recognition of the inputted speech (S510). By using a result of the speech recognition and the inputted speech, the speech recognizing unit 210, the fundamental frequency extracting unit 220, the accent phrase estimating unit 230, and the accent determining unit 240 generate the first learning data (S520) in which pronunciations, accents and the like are associated with the wording of each phrase. With reference to FIGS. 6 to 8, a specific example of this processing is described.

FIG. 6 shows frequencies measured from the speech for learning. By using a device such as Laryngograph, the fundamental frequency extracting unit 220 detects voiced sound in the form of changes over time in fundamental frequency. Results of detecting frequencies at predetermined measurement intervals are indicated by marks of "x" in FIG. 6.

FIG. 7 shows confidence parts among the measured frequencies. The accent phrase estimating unit 230 excludes from the measured frequencies parts judged to be measurement errors, and selects the trustworthy parts. Selected results are indicated by cross marks in FIG. 7.

FIG. 8 shows specific examples of estimated accent phrases. In order to determine accent phrases, first of all, the accent phrase estimating unit 230 reads information on positions of pauses from alignments, and divides data on fundamental frequencies by breath group. Then the accent phrase estimating unit 230 performs the following processing steps in the following order for each of breath groups:

(0) setting all of the cross marks within each breath group as initial values within pronounced with accents of "LHH-HHH" in a case where another noun is written continuously after "kyouto tawaa." That is, this example indicates that a frequency at which the wording is pronounced as "kyouto tawaa" in an example such as "kyouto tawaa hoteru" is the index value of 30.

Additionally, in the frequency data 40, with the same combination of "kyouto tawaa" in wording, information on separations between phrases is associated, the information indicating that "kyouto" and "tawaa" are different phrases. Furthermore, in!; the frequency data 40, with this combination in wording, a combination of word classes which is "proper noun: general noun" is associated. Additionally, in the frequency data 40, a combination of pronunciations which is "kyo: totawa:," and a set of kinds of accents respectively corresponding to accent phrases which is "LHHHLL" are associated therewith. Additionally, in the frequency data 40, an index value of 60 indicating an appearance frequency of the combination is associated therewith. According to an actual example such as "kyouto tawaa ni itta (went to Kyoto Tower)," the phrases "kyouto tawaa" is mostly pronounced with accents of "LHHHLL" in a case where a phrase that is not a noun is written continuously after "kyouto tawaa." That is, this example indicates that a frequency at which the wording is pronounced as "kyouto tawaa" in an example such as "kyouto tawaa ni itta" is the index value of 60.

Additionally, in the frequency data 40, with the same combination of "kyouto tawaa" in wording, information on separations between phrases is associated, the information indicating that "kyou" and "totawaa" are different phrases. Furthermore, in the frequency data 40, with this combination in wording, a combination of word classes which is "general noun: general noun" is associated. Additionally, in the frequency data 40, a combination of pronunciations which is "kyototawa:," and a set of kinds of accents respectively corresponding to accent phrases which is "LHLHL" are associated therewith. Additionally, in the frequency data 40, an index value of 5 indicating an appearance frequency of the combination is associated therewith. Although such a separation between phrases as in the case with this example is originally inaccurate, a recognition result of this kind can be brought about in some cases depending on precision in speech recognition, an error by a speaker in speech for learning, and the like. a range;

(a) finding the mean square of errors when pitch marks within the range are approximated to a triangular model;

(b) if the mean square of errors is under a threshold value, the range is judged to be a single triangular model;

(c) if the error of mean square is not less than a threshold value, the subject range is made into two ranges by dividing the range at a point minimizing a total of errors of the two ranges; and (d) performing the processing for each of the two ranges after going back to the processing step (a).

Then, the accent phrase estimating unit 230 unites together the triangular models, with respect to each of the breath groups, thereby finding ranges of accents phrases. Basically, each one of the triangular models is a range of an accent phrase. For example, a first accent phrase 800, a second accent phrase 810, and a third accent phrase 820 are each an accent phrase. However, in the following cases, the accent phrase estimating unit 230 unites together plural ones of the triangular models, and judges the plural ones thereof to be a single accent phrase. For example, a fourth accent phrase 830 and a fifth, accent phrase 840 are united together, and are judged to be a single accent phrase, yielding three cases:

(1) A case where a length of the triangular model is shorter than a predetermined i criterial value;

(2) A case where slopes of continuing ones of the triangular models are smaller than a predetermined criterial value; and (3) A case where a part in which a frequency increases in a successive one of the triangular models is shorter than a predetermined criterial value.

Then, the accent phrase estimating unit 230 judges, as a range of a single accent phrase, a range from a time position of an initial pitch mark to a time position of a final pitch mark within each of the accent phrases. Subsequently, the accent determining unit 240 performs the following processing steps in order to determine the kinds of accents:

(1) with respect to each of the accent phrases, normalizing the fundamental frequencies into values not less than 0 and not more than 1;

(2) with respect to each mora (in Japanese, onji) $m_i$ within each of the accent phrases, computing a slope $g_i$ of each mora $m_i$ through least squares approximation;

(3) setting an ending pitch of each mora as $e_i$, or, in a case where there is a sudden change in a border between moras, performing different processing;

(4) using evaluation functions, regarding whether each mora is UP, DOWN HIGH, or LOW which are defined as follows:.

$F\text{-LOW}(|g_i|,e_i) = f\text{flat}(|g_i|) \times (1-e_s),$ $F\text{-HIGH}(|g_i|,e_i) = f\text{flat}(|g_i|) \times e_i$ $F\text{-UP}(|g_i|,e_i) = (1-f\text{flat}(|g_i|)) \times e_i,$ and $F\text{-DOWN}(|g_i|,e_i) = (1 - f\text{flat}(|g_i|)) \times (1 \times e_i),$ where the function "fflat" is a sigmoid function or a function similar thereto;

(5) so that totals of the respective evaluation functions F-LOW, F-HIGH, F-UP and F-DOWN can be 1 with respect to each mora, performing normalization; and (6) finding a combination of the evaluation functions F-LOW, F-HIGH, F-UP and F-DOWN which maximizes values of the respective evaluation functions, and judging the combination as a kind of accents.

By performing the above described processing steps, the accent determining unit 240 can determine kinds of accents with respect to the first to-third accent phrases 800 to 820, and a union between the fourth and fifth accent phrases 830 and 840.

The first learning data 30 is generated by associating the thus recognized accents with the phrases and the pronunciations which have been recognized by the speech recognizing unit 210.

Referring also to FIG. 5, based on the first learning data 30, the frequency data generating unit 270 generates the frequency data indicating a wording of phrases, and appearance frequencies of readings thereof (S530). The thus generated frequency data 40 may be newly generated, or may be generated by synthesizing the frequency data acquired by the acquisition unit 260 and the frequency data determined based on the first learning data 30. One example of the processing of generating the frequency data through the synthesis will be described.

First of all, with respect to each combination of plural phrases continuously written, the frequency data generating unit 270 generates a frequency data candidate by taking a weighted average of an appearance frequency of each combination of readings of the phrases in the frequency data acquired by the acquisition unit 260, and an appearance frequency at which each combination of readings of the phrases appears in the frequency data in the first learning data 30. Preferably, the frequency data generating unit 270 may generate the plural frequency data candidates in which different weights are used in taking the weighted averages respectively corresponding thereto. That is, for example, if a combination of the reading has the index value being 30 in the acquired frequency data the index value being 60 in the first learning data 30, and the weights being 1:1, 45 (=(30+60)/2) is computed as the appearance frequency of the combination in the frequency data candidate. Additionally, if the combination has the weights being 2:1 with the other conditions being the same, 50(=(30×1+60×2)/3) is computed as the appearance frequency of the combination.

Next, with respect to each of the frequency data candidates, the frequency data generating unit 270 causes the language processing unit 52 to generate a reading of the wording by using each of the frequency data candidates, on the basis of the wording of the phrases in the first learning data 30. Then, with respect to each of the frequency data candidates, the frequency data generating unit 270 computes a rate at which the reading having been caused to be generated by the language processing unit 52, coincides with a reading in the first learning data 30. For example, the rate of how much the reading coincide therewith may be evaluated by a number of phrases in the wording which coincide in these readings, or may be evaluated by a number of characters in the writing which coincide in these readings. The frequency data generating unit 270 judges, as new frequency data, the frequency data candidate making the rate at which the reading coincide therewith not less than a predetermined criterion, and outputs the frequency data candidate to the setting unit 280. The frequency data generating unit 270 may judge, as new frequency data, the frequency data candidate making the highest rate at which the reading coincide therewith.

Thus, by updating already-existing frequency data by using new learning data, speech synthesis is made possible even in a case where a sufficient amount of learning data is not available and synthesized speech in which an individuality of speech for learning is reflected can be outputted.

Subsequently, the setting unit 280 sets the frequency data 40 in the language processing unit 52 (S540). Additionally, in order to generate the second learning data, the accent determining unit 240 determines accents of phrases based on the speech inputted for learning (S550). The thus determined accents form the second learning data along with information indicating: the pronunciations recognized by the speech recognizing unit 210; the fundamental frequencies extracted by the fundamental frequency extracting unit 220; and the separations between accent phrases estimated by the accent phrase estimating unit 230. Based on data such as readings of phrases, phoneme alignments, positions of accent phrases, positions of pauses, and the like, the sound data generating unit 290 generates sound data such as waveform data and rhythm models (S560). The setting unit 280 sets this sound data in the sound processing unit 54 in order to approximate outputted speech of text-to-speech to the speech recognized for learning (S570).

Figure 9:
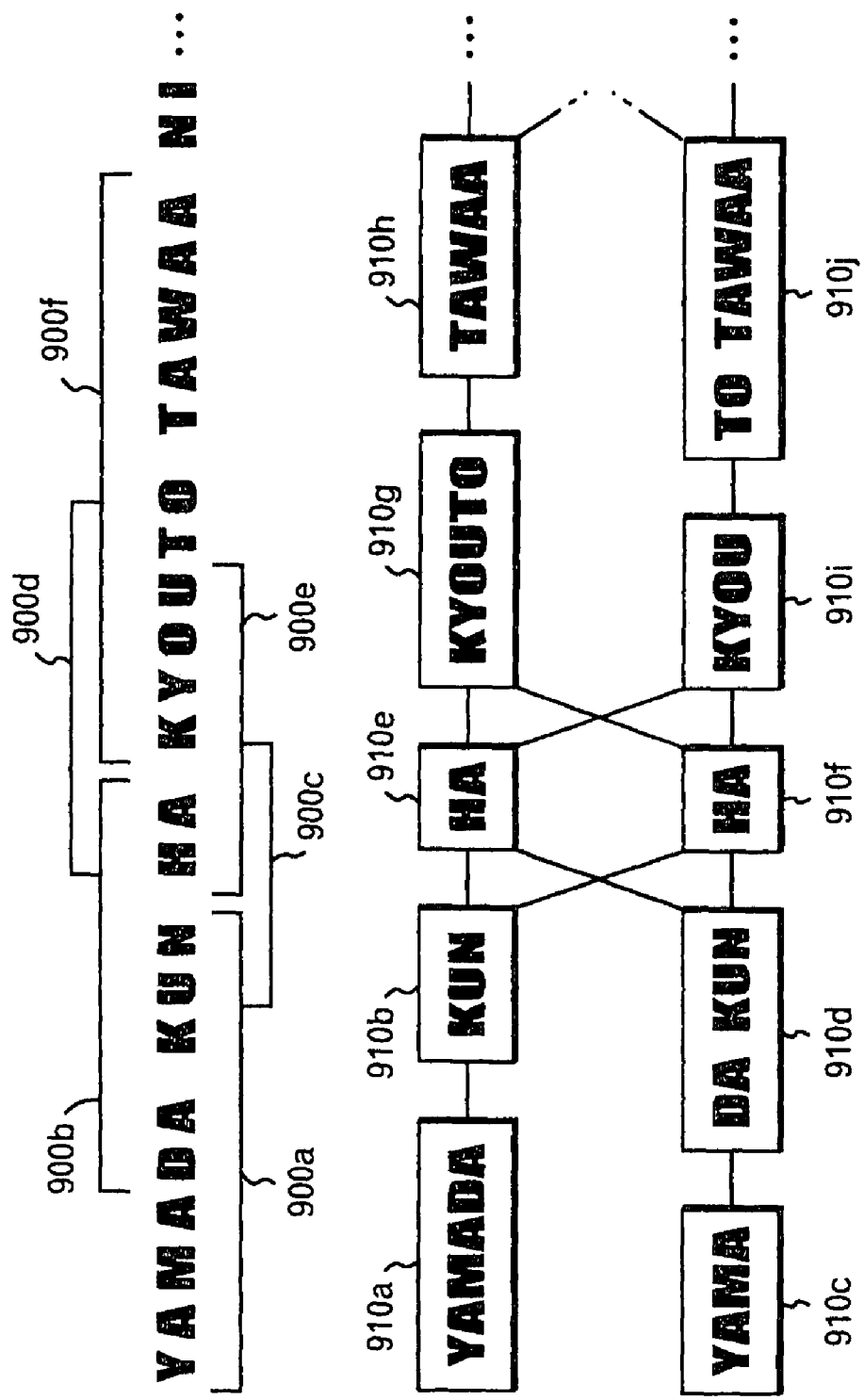
FIG. 9 shows one example of text-to-speech processing performed based on frequency data having been set.

FIG. 9 shows one example of text-to-speech processing performed based on the frequency data having been set. In order for the language processing unit 52 to select a reading and accents based on a wording of text, the language processing unit 52 uses information on appearance frequencies computed with respect to each combination of phrase wordings, and with respect to each combination of readings as will be described i connection with this drawing. Hereinafter, this processing will de specifically described First of all, the language processing unit 52 acquires text including plural phrases. This text is, for example, set as "yamada kun ha kyouto tawaa . . . . " In this text, separations between phrases of the subjected text are not explicit.

The language processing unit 52 first selects a part corresponding to "yamada kun" within this text as a subjected text piece 900*a* which is a combination of phrase wordings subjected to the processing. The language processing unit 52 retrieves a combination of wordings coinciding with the subjected text piece 900*a* from the combinations of phrase wordings contained in the frequency data 40. For example, the language processing unit 52 may retrieve from the frequency data 40 a combination of a phrase 910*a* which is "yamada," and a phrase 910*b* which is "kun," and further retrieve therefrom a combination of a phrase 910*c* which is "yama," and a phrase 910*d* which is "dakun."

At this time, in the frequency data 40, the wording "yamada" is associated with an accent continuously and naturally pronounced as "yamada" which may be popular surname and place name in Japan, whereas the wording "yama" is associated with an accent appropriate for a general noun meaning a mountain and the like. Additionally, although the plural combinations of wordings in which borders between phrases are different are shown for the convenience of explanation in the example of this drawing, combinations of wordings in which borders between phrases are the same only with readings or accents being different may be retrieved.

Then, with respect to each of combinations of readings and accents corresponding to the combination of the retrieved wordings, the language processing unit 52 acquires, from the frequency data 40, appearance frequencies associated with each of the combinations. For example, suppose that in learning data, the number of times when the phrases 910*a* and 910*b* appear in series is nine times, and the number of times when the phrases 910*c* and 910*d* appear in series is once. Then, an index value indicating an appearance frequency which is nine times as large as an appearance frequency of the combination of phrases 910*c* and 910*d* is associated with the combination of the phrases, 910*a* and 910*b* in the frequency data 40.

Subsequently, the language processing unit 52 shifts the processing to a next subjected text piece. For example, the language processing unit 52 selects the wording "dakun ha" as a subjected text piece 900*b*. The language processing unit 52 retrieves: a combination of the phrase 910*d* which is "dakun," and a phrase 910*e* which is "wa"; and a combination of the phrase 910*d* which is "dakun," and a phrase 910*f* which is "ha". Here, the phrases 910*e* and 910*f* are the same in wording, but are retrieved separately because they have different readings or different accents. The language processing unit 52 computes an appearance frequency at which the phrases 910*d* and 910*e* appear in series, and an appearance frequency at which the phrases 910*d* and 910*f* appear in series.

Furthermore, the language processing unit 52 shifts the processing to a next subjected text piece. For example, the language processing unit 52 selects the wording "kun ha" as a subjected text piece 900*c*. The language processing unit 52 retrieves: a combination of the phrase 910*b* which is "kun," and the phrase 910*e* which is "wa"; and a combination of the phrase 910*b* which is "kun," and the phrase 910*f* which is "ha". The language processing unit 52 acquires an appearance frequency at which the phrases 910b and 910e appear in series, and an appearance frequency at which the phrases 910b and 910f appear in series.

Thereafter, the language processing unit 52 sequentially selects a subjected text piece 900d, a subjected text piece 900e, and a subjected text piece 900f. Then, with respect to each of combinations of wordings coinciding with wordings of each of the subjected text pieces, the language processing unit 52 acquires appearance frequencies at which combinations of readings and accents thereof appear. Finally, with respect to each of paths in each of which combinations of wordings coinciding with a part of the inputted text are sequentially selected, the language processing unit 52 computes a product of appearance frequencies of these combinations of wordings. As one example, with respect to a path in which the phrase 910a, the phrase 910b, the phrase 910e, a phrase 910g and a phrase 910h are sequentially selected, the language processing unit 52 computes a product of appearance frequencies of these combinations of wordings.

This computation processing is preferably generalized into the following equation (1):

$$M_u(u_1 u_2 \cdots u_h) = \prod_{i=1}^{h+1} P(u_i | u_{i-k} \cdots u_{i-2} u_{i-1}) \quad (1)$$

In this equation, h indicates a number of combinations of wordings, and is 5 in the example of this drawing. Additionally, k is a number of phrases in the context which are considered retroactively, and k=1 in the example of this drawing because a 2-gram model is supposed therein. Additionally, u=(w,t,s,a), where w, t, s, and a correspond to the respective characters in FIG. 3, and denote a wording, a word class, a pronunciation, and an accent.

The language processing unit 52 selects a combination of readings and a combination of accents which give the largest one of the appearance frequencies computed with respect to the respective paths. This selection processing is preferably generalized into the following equation (2):

$$\hat{u} = \operatorname{argmax} M_u(u_1 u_2 \ldots u_h | x_1 x_2 \ldots x_h) \quad (2)$$

In this equation, $x_1 x_2 \ldots x_h$ indicates text acquired by the language processing unit 52, and each of $x_1$, and $x_2$ to $x_h$ is a character.

According to the above computation and selection processing, based on appearance frequencies of combinations of readings contained in the frequency data 40, the language processing unit 52 can determine a reading of each phrase in acquired text in consideration of the context thereof.

Figure 10:
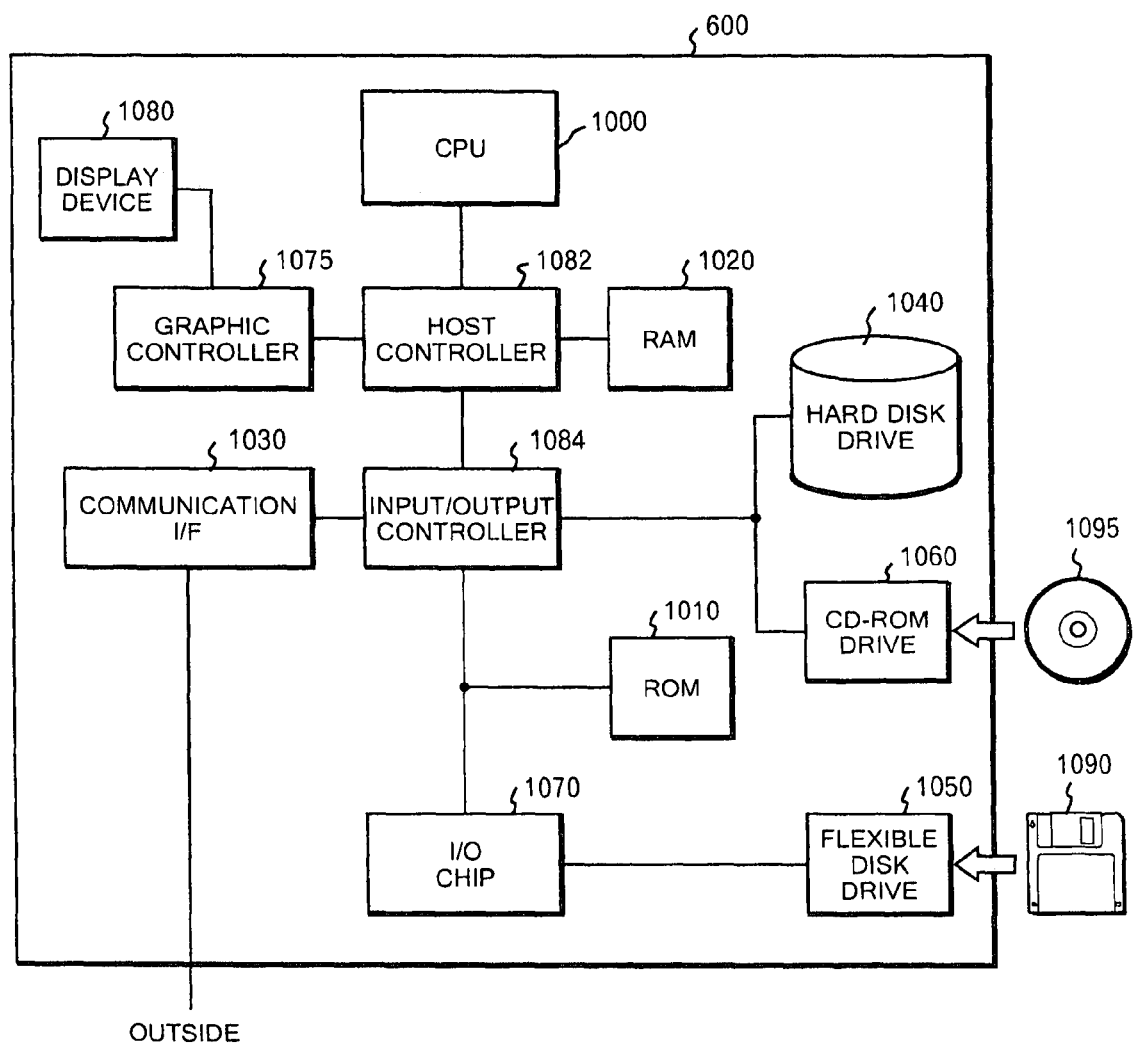
FIG. 10 shows one example of a hardware configuration of an information processing apparatus which functions as the supporting system.

FIG. 10 shows one example of a hardware configuration of an information processing apparatus 600 which functions as the supporting system 20. The information processing apparatus 600 has: a CPU peripheral section including a CPU 1000, a RAM 1020 and a graphic controller 1075 which are mutually connected by a host controller 1082; an input/output section including a communication interface 1030, a hard disk drive 1040 and a CD-ROM drive 1060 which are connected with the host controller 1092 via an input/output controller 1084; and a legacy input/output section including a ROM 1010, a flexible disk drive 1050 and an input/output chip 1070 which are connected with the input/output controller 1084.

The host controller 1082 connects the RAM 1020 with the CPU 1000 and the graphic controller 1075 which access the RAM 1020 at a high transfer rate. The CPU 1000 operates based on programs stored in the ROM 1010 and the RAM 1020, and controls the respective sections. The graphic controller 1075 obtains image data generated by the CPU 1000 and the like on a frame buffer provided within the RAM 1020, and displays the image data on a display device 1080. Instead of this, the graphic controller 1075 may contain therein a frame buffer for storing image data generated by the CPU 1000 and the like.

The input/output controller 1084 connects the host controller 1082 with the communication interface 1030, the hard disk drive 1040 and the CD-ROM drive 1060 which are relatively high-speed input/output devices. The communication interface 1030 communicates with an external apparatus via a network. The hard disk drive 1040 stores programs and data used by the information processing apparatus 600. The CD-ROM drive 1060 reads out a program or data from a CD-ROM 1095 and supplies it to the RAW 1020 or the hard disk drive 1040.

Additionally, the relatively low-speed input/output devices including the ROM 1010, the flexible disk drive 1050 and the input/output chip 1070 are connected with the input/output controller 1084. The ROM 1010 stores: a boot program executed by the CPU 1000 at the startup of the information processing apparatus 600; programs dependent on the hardware of the information processing apparatus 600; and the like. The flexible disk drive 1050 reads a program or data from the flexible disk 1090 and supplies it to the RAM 1020 or the hard disk drive 1040 via the input/output chip 1070. The input/output chip 1070 connects the various input/output devices through the flexible disk 1090, and through, for example, a parallel port, a serial port, a keyboard port and a mouse port.

A program provided to the information processing apparatus 600 is stored in the flexible disk 1090, the CD-ROM 1095 or a recording medium such as an IC card, and is provided by the user. The program is read from the recording medium through at least any one of the input/output chip 1070 and the input/output controller 1084, and is installed in the information processing apparatus 600 to be executed. Operations which the program causes the information processing apparatus 600 and the like to execute are the same with those in the supporting system 20 which have been described in connection with FIGS. 1 to 9, and therefore, description thereof will be omitted.

The program described above may be stored in an external recording medium. As the recording medium, any one of an optical recording medium such as a DVD and a PD, a magneto-optic recording medium such as an MD, a tape medium, a semiconductor memory such as an IC card, and the like may be used other than the flexible disk 1090 and the CD-ROM 1095. Additionally, the program may be supplied to the information processing apparatus 600 via the network by using as the recording medium a storage device such as a hard disk and a RAM provided in a server system connected with a dedicated communication network or the Internet.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through, a system bus. The memory elements can-include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As has been described hereinabove, according to the supporting system 20 according to this embodiment, natural synthesized speech based on the speech for learning can be generated more effectively than before. Thereby, various sorts of synthesized speech in which dialects and individualities are reflected can be generated with low cost within a short time. According to this technology, for example, applications as will be described below become possible.

APPLICATION EXAMPLE 1

Conventionally, synthesized speech has been often generated in accordance with manners of speech of announcers, and a technical difficulty has been involved in work of reflecting therein arrangement of a dialect or an individuality. According to this embodiment, synthesized speech in which an individuality of the speech for learning is reflected can be easily generated. Thereby, for example, by collecting pieces of speech vocalized by a patient of a throat disease before the patient loses voice, and by utilizing them as the speech for learning, synthesized speech in which the patient's own individuality is reflected can be outputted even after the patient loses voice.

APPLICATION EXAMPLE 2

Some corporations may have a voice (a corporate voice) determined, the voice being used for marketing of the corporations, for example, in an automated answering system at a call center, or in a TV/radio commercial message. It has not been possible to use conventional synthesized speech in automated synthesis of such a corporate voice because the conventional synthesized speech simulates a manner of speech of an announcer. According to this embodiment, various corporate voices which differ from corporation to corporation can be efficiently generated.

APPLICATION EXAMPLE 3

Car navigation systems, home videogame machines, or personal robots may in (some cases have a function of conversing with a user. For example, they may be enables to operate in accordance with speech of the user, and to communicate a result of processing to the user by way of speech. According to this embodiment, various sorts of speech can be inexpensively generated, such speech for conversation can be easily tailored to the user's liking.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method of supporting text-to-speech synthesis, the method comprising:

acquiring first frequency data set in a language processing unit, the first frequency data indicating appearance frequencies of readings corresponding to text wordings;

recognizing speech produced by a user reading a learning text;

generating first learning data by associating recognized readings from the speech with portions of the learning text, or by recognizing both wordings and readings of phrases from the speech;

generating, based on the first learning data, second frequency data indicating appearance frequencies of readings corresponding to wordings of phrases from the speech;

generating a plurality of frequency data candidates, each frequency data candidate indicating, for at least one combination of a plurality of continuously-written phrases, an appearance frequency of at least one combination of readings, the appearance frequency of the at least one combination of readings comprising a weighted average of an appearance frequency of the at least one combination of readings from the first frequency data with an appearance frequency of the at least one combination of readings from the second frequency data, wherein each of the plurality of frequency data candidates uses different weights for the weighted average;

for each one of the plurality of frequency data candidates using different weights for the weighted average, using the language processing unit to generate a set of readings corresponding to the learning text using the one of the plurality of frequency data candidates, wherein the set of readings comprises a subset of readings that match readings of the first learning data, and calculating a ratio of the subset of readings to the set of readings, wherein a first frequency data candidate of the plurality of frequency data candidates has a highest calculated ratio;

updating frequency data in the language processing unit using the first frequency data candidate with the highest calculated ratio; and setting the updated frequency data in the language processing unit.

\* \* \* \* \*